United States Patent [19]

von Niederhäusern et al.

[11] Patent Number: 4,656,897

[45] Date of Patent: Apr. 14, 1987

[54] NUMERICAL CONTROL DEVICE FOR AUTOMATIC LATHE

[75] Inventors: Francis von Niederhäusern, Moutier; Eugen Matthias, Zürich, both of Switzerland

[73] Assignee: VN SA Electronics, Moutier, Switzerland

[21] Appl. No.: 857,002

[22] Filed: Apr. 29, 1986

[30] Foreign Application Priority Data

May 2, 1985 [CH] Switzerland ............. 01856/85

[51] Int. Cl.⁴ .................................................. B23B 7/00
[52] U.S. Cl. .................................... 82/2 B; 82/21 B; 318/39; 318/625; 364/474
[58] Field of Search ............... 82/2 B, 2 R, 19, 21 R, 82/21 B; 364/167, 168, 169, 170, 474; 318/39, 567, 568, 578, 625

[56] References Cited

U.S. PATENT DOCUMENTS

| | | | |
|---|---|---|---|
| 3,656,377 | 4/1972 | Kosem | 318/39 |
| 3,894,452 | 7/1975 | Kazik et al. | 82/2 B |
| 3,976,861 | 8/1976 | Edwards et al. | 318/39 |
| 3,978,745 | 9/1976 | Okamoto | 82/2 B |
| 4,106,375 | 8/1978 | Gurdak et al. | 82/21 B |
| 4,120,185 | 10/1978 | Schneider et al. | |
| 4,250,779 | 2/1981 | Feller et al. | 82/21 B |
| 4,253,359 | 3/1981 | Youden | 82/21 B |
| 4,267,495 | 5/1981 | Wilterdink | 318/39 |
| 4,386,305 | 5/1983 | Kohzai et al. | 318/39 |
| 4,415,977 | 11/1983 | Fukuyama et al. | 364/474 |

Primary Examiner—Nicholas P. Godici
Assistant Examiner—Jerry Kearns
Attorney, Agent, or Firm—Pollock, Vande Sande & Priddy

[57] ABSTRACT

The cabinet of the numerical control device contains a memory, a frequency changer, an amplifier and two correcting units. A programing station with keyboard and mounted on the cabinet enables programing the memory. The control device further comprises an encoder and a DC motor. It shall be associated with a lathe mechanically controlled by cams. The encoder records the successive positions of the camshaft and transmits these informations to the memory. In accordance with these informations the latter transmits mandatory instructions to the frequency changer and to the amplifier which modify the motor speeds and, consequently, those of the spindle and of the camshaft, to an extent dictated to the memory by the keyboard. At the beginning of particular machining steps the memory can activate the correcting units thus permitting to modify the instructions of the memory in order to find out the optimal speeds after some tests.

5 Claims, 1 Drawing Figure

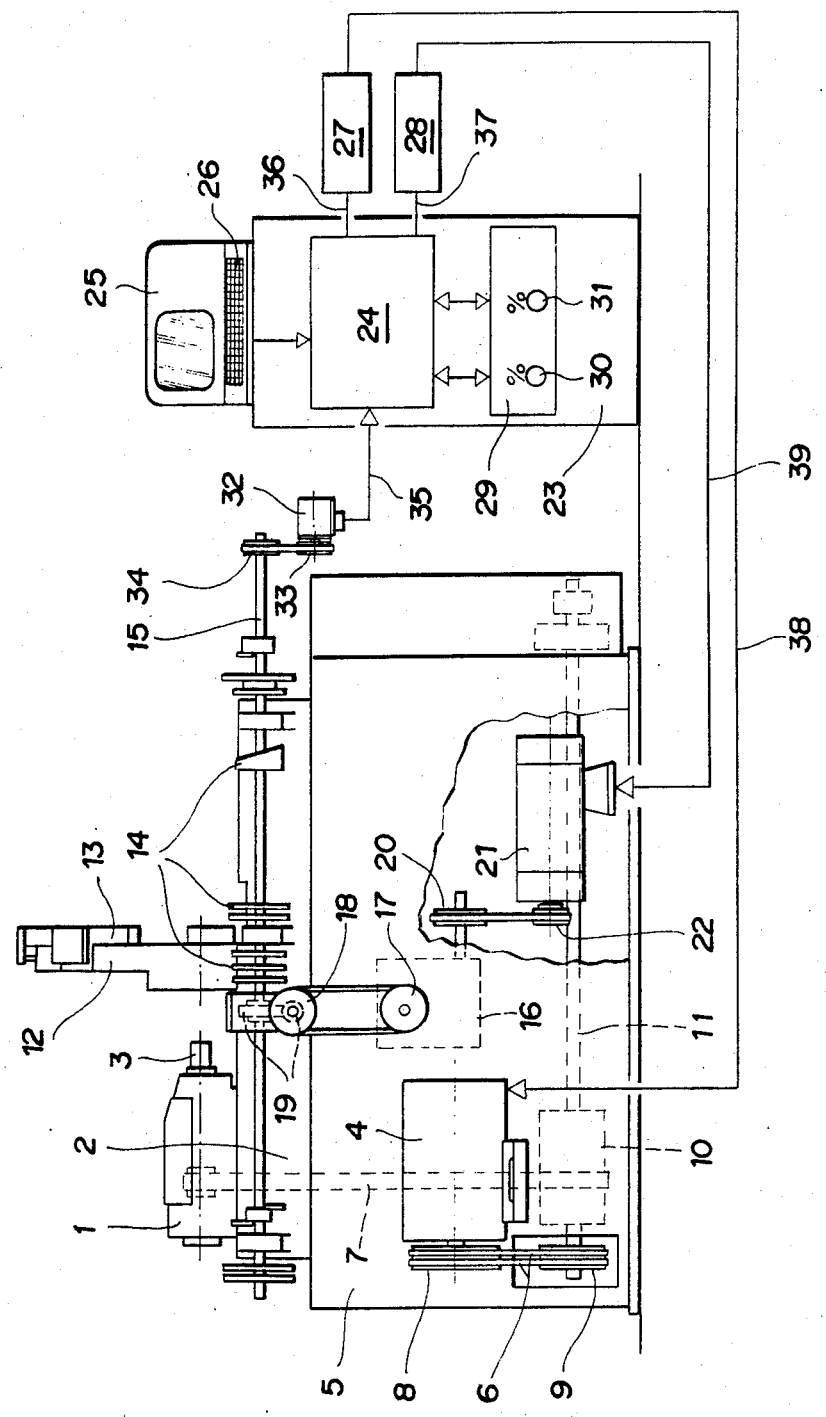

NUMERICAL CONTROL DEVICE FOR AUTOMATIC LATHE

BACKGROUND OF THE INVENTION

1. Field of the Invention

This invention relates to numerical control devices to ensure driving of the members of a single spindle automatic lathe, the operations of which are mechanically produced by a camshaft.

2. Description of the Prior Art

Before the rather recent coming out of the numerical control devices, the lathes of the above mentioned type were the only ones at disposal to machine in a fully automatic manner series of identical workpieces out of bars of stock.

As soon as the numerical control devices cam out, the lathe producers considered the creation of a new type of automatic lathes, especially designed in function of the new control mode. The user of such a lathe thus can undertake small series of workpieces, even prototypes at costs similar to those of great series, because setting such a machine does not take much time. For the workman familiar with automatic lathes, the diagram of the required operations to machine a given workpiece is soon established and its typing in the computer memory of the numerical control device is immediate.

The cost of these automatic lathes is, however, high so that there are generally much less than 20% of the same to be found in the equipment of the lathe-turning factories. For many reasons it would anyway not be judicious if such a factory changed its whole equipment to numerically controlled lathes.

Machining great series of workpieces having complicated shapes and therefore requiring the use of more than ten tools does not pay on a numerically controlled lathe. Moreover, a mechanical control by means of cams is more reliable than an electronic control; it has less troubles. In addition thereto, if with a mechanically controlled lathe a breakdown nevertheless occurs, the user can himself execute the repair. On the contrary, a failure of an electronic control necessitates the service of a foreign expert, if not even of the machine producer himself, thus at least causing a relative long stop of the production, while the user is compelled to a complete passivity.

The use of numerically controlled lathes has, however, pointed out that the conventional lathes controlled by cams had shortcomings of which the users were more or less aware, however without measuring the real extent thereof. Anyway, the users of numerical control devices immediately eliminated these shortcomings by programming their lathes so as to ensure the most favorable cutting speed of every tool.

Automatic lathes being mechanically controlled by cams and in which the spindle can be driven at two different speeds are, however, known in the art, but they are strictly limited to that possibility.

There are also known in the art automatic lathes, in particular multi-spindle automatic lathes, in which the camshaft is driven by an independent motor subjected to an electronic device which is sensitive to the angular positions of the camshaft and which accelerates the rotational speed of that motor and consequently of the camshaft when the tools have to be moved either from their rest position into that in which they are ready to undertake their machining operation, or from that in which they have just performed their operation into their rest position (U.S. Pat. No. 4,253,359). The electronic device of these known lathes thus simply switches over the rotational speed of the camshaft motor from a high speed, for the approach movement of the tools, to a lower speed, for the operation thereof, and then again from that low speed to the high speed, for the return movement of the tools. That known device does, however, in no way affect the motor driving the spindles which consequently always rotate at the same speed. Now, it is precisely the spindle speed which should be varied, and that, not to abruptly change over from a predetermined speed to another predetermined one, but to progressively change over from one speed to another one in a continuous manner.

There are also known in the art machines, such as presses or machines comprising transfer mechanisms, in which the conventional control devices with cams or with switching boxes are replaced by an electronic control device with almost instantaneous reactions in order to increase the working rythm as a whole (U.S. Pat. No. 4,120,185). These known control devices thus do not control the machines with which they are associated so that they would work at different speeds during a cycle of operations, but so that they work at a unique high speed.

According to the shape of the pieces which have to be machined on an automatic lathe, the tools which would be more suitable to that end, would, however, require more than two different speeds of rotation of the lathe spindle, because of their cutting speeds. Moreover, to carry out a radially directed recessing feed of a tool, especially to sever the finished workpiece from the bar of stock, the rotational speed of the lathe spindle should progressively be accelerated as the tool comes nearer to the workpiece axis, in order that the cutting speed remains constant. Since the known automatic lathes being mechanically controlled by cams do not permit these variations of the lathe spindle speed during a turning operation, their users hitherto had to resort to less favorable tools to carry out some machining operations, viz. to tools which soon lose their edge to the prejudice of the production.

SUMMARY OF THE INVENTION

The invention aims to cope with the above evoked shortcomings by creating a numerical control device which permits any kind of variation of the rotational speed of the lathe spindle during the machining operations, which is obtainable at a moderate price and which can rapidly be mounted on a conventional lathe of the type considered hereabove substantially without modifying that lathe.

According to the invention the numerical control device comprises an encoder and a numerically programmable memory. The encoder is associated with the camshaft and it uninterruptedly records the successive angular positions thereof. The memory is programmed in view of the control of the rotational speed of the motors. Therefore, it permanently receives from the encoder informations corresponding to the records thereof and, as said informations proceed, it immediately and simultaneously transmits to the motors mandatory instructions according to its running program, these instructions causing the motors to rotate at speeds ensuring a work under the best possible conditions, among these conditions the permanent operation of every tool at its most favorable cutting speed constituting the principle one. In particular, the memory can adapt the rotational speed of the spindle motor to different natures of tools such as cutting tools with nitride plate or made out of sintered hard metal or of high-speed steel, drills, screw-taps, so that every tool of the lathe will operate under its best conditions, i.e. at the adequate cutting speed. Moreover, when a cutting tool proceeds to a radially directed recessing feed in the material of the bar of stock either to machine a groove or to sever the finished workpiece from the bar, the memory can progressively accelerate the spindle motor as the tool comes nearer to the workpiece axis. The memory simultaneously can also accelerate the rotational speed of the camshaft in order to keep the chip being detached from the bar at a substantially constant thickness.

It should be observed that the encoder is a standard unit being produced in great series, thus being available on the market at a moderate price. The memory only has to be provided so that it can be programmed in function of every model of workpiece to be produced.

It is also an object of the invention to enable the user to quickly introduce himself into the memory the program required by every new workpiece he has to produce, in order that the motors always rotate at the most convenient speeds during each machining step of that workpiece.

Another object of the invention is to render more easy the transmission of the mandatory instructions of the memory to the asynchronous spindle motor.

A further object of the invention similarly consists to facilitate the transmission of the mandatory instructions of the memory to the camshaft motor which can be either a DC or an AC motor.

Still another object of the invention is to enable the latheman, who does not know the exact speed at which the motors should rotate during a determined step of machining the workpiece to operate under the best possible conditions, to easily correct the mandatory instructions of the memory without having to modify the program thereof.

Still further objects of the invention will become apparent to those skilled in art in the course of the following description.

BRIEF DESCRIPTION OF THE DRAWING

One embodiment of the control device according to the invention is represented diagrammatically and simply by way of example in the accompanying drawings in which the single FIGURE is an elevational view thereof.

DESCRIPTION OF THE PREFERRED EMBODIMENT

The numerical control device represented is associated with a Swiss type lathe comprising a headstock 1 which is longitudinally movable on a bed 2. A spindle 3 is rotatably mounted in headstock 1. It can be driven in rotation by an asynchronous motor 4 which is located in a supporting frame 5 of the lathe. The mechanical connection between motor 4 and spindle 3 is conventionally realized by means of belts 6, 7 and pulleys 8, 9, 10, the two last ones being set on an axle 11 also located in the supporting frame 5.

Spindle 3 is arranged to drive a bar of stock in rotation. The fore portion of the latter is firmly held by a guiding bush (not shown) which is mounted in an upright support 12. Fan-wise arranged tools (not shown) are also mounted on support 12. These tools are fixed to sliders 13 which are movable in a radial direction with respect to the spindle axis, in order to let the tools they carry machine the side face of the workpieces to be produced. Other tools (not shown) permit to machine the front face of the workpieces.

The operations of the lathe described are mechanically controlled by cams 14 set on a camshaft 15. The latter is driven in rotation by a speed reducer 16 through pulleys 17, 18 and a worm gear 19. With the known lathes of this type the inlet pulley 20 of reducer 16 is driven by a pulley set on axle 11.

To associate the control device according to the invention with the lathe described the last pulley is removed and a DC motor 21 belonging to the numerical control device is mounted in the lathe supporting frame 5. It is pulley 22, set on the axle of motor 21, which drives pulley 20 of reducer 16 and consequently the camshaft 15.

A cabinet 23 of the numerical control device contains a memory 24, a frequency changer 27, an amplifier 28 and two correcting units 29, each one of which being manually adjustable by means of a knob 30, 31, respectively. A station 25 with a keyboard 26 mounted on cabinet 23 permits to program memory 24. The numerical control device still comprises an encoder 32 which is associated with camshaft 15 through pulleys 33, 34.

Encoder 23 uninterruptedly records the angular position of camshaft 15 and it immediately transmits this information to memory 24 through line 35. To every angle, through which the camshaft 15 rotates during a full revolution producing a complete workpiece, corresponds a function or operation of the lathe: gripping the bar of stock in spindle 3, forward and backward motion of headstock 1 and/or of one or several tools, severing the completely machined workpiece from the bar of stock and releasing the grip of the stock bar to permit its feeding for the next workpiece to be machined. The data which have previously been introduced into memory 24 by means of keyboard 26 correspond to the speeds at which spindle 3 and camshaft 15 must rotate when the latter itself rotates through every angular position during a complete revolution. According to the informations received from encoder 32 memory 24 thus is capable to transmit mandatory instructions, firstly, to the frequency changer 27 and, secondly, to the amplifier 28 through its outlet lines 36 and 37.

The frequency changer 27 is connected to motor 4 by means of a line 38. In accordance with the mandatory instructions successively received from memory 24 the frequency changer 27 modifies the frequency of the electrical current supply to motor 4, so that the rotational speed of the latter changes, as necessary, to let spindle 3 rotate at the desired speed after every order emitted by the frequency changer 27.

The amplifier 28 is similarly connected to motor 21 by means of a line 39. In accordance with the successive mandatory instructions received from the memory 24 it modifies the current supply to motor 21 so that its rotational speed changes as well as that of camshaft 15. It should be noted that there are also AC motors, the rotational speed of which can be modified by an amplifier. Nowadays, however, they are rather expensive.

During every angle through which the camshaft 15 rotates the numerical control device described enables the latheman to prescribe a determined rotational speed to spindle 3 and to camshaft 15. During anyone of these angles, for instance during that corresponding to the severing operation of the finished workpiece, the rotational speeds of spindle 3 and/or of camshaft 15 can, of course, progressively be modified.

To machine workpieces for which the latheman exactly knows at which speeds spindle 3 and camshaft 15 must rotate during every step of the machining cycle, the correcting units 29 remain out of service. If, on the contrary, the latheman is not sure of the speed at which spindle 3 or camshaft 15 or both must rotate during a particular machining operation, he can, by means of keyboard 26, order the memory 24 to activate anyone or both correcting units 29 for the duration of that machining step.

The first one of these correcting units 29 is connected to the start point of line 36. If it has been activated by memory 24, its knob 30 permits to correct either upwards or downwards the instruction which the memory would transmit to the frequency changer 27 in the absence of said first corresponding unit. The second correcting unit 29 is similarly connected to the start point of line 37 and its knob 31 similarly permits to correct in the same way the instruction transmitted to amplifier 28. These corrections of the mandatory instructions transmitted to the frequency changer 27 and to amplifier 28 obviously result in variations of the rotational speeds of motor 4 and of motor 21, respectively, and, consequently of spindle 3 and camshaft 15. The frequency changer and the amplifier 28 are, of course, chosen so that said speeds may be changed to a sufficient extent in order to find out the optimal rotational speeds of spindle 3 and camshaft 15 after some tests made before starting the effective production. The correction by means of knobs 30, 31 is obviously easier and, above all, quicker than a correction made by means of keyboard 26.

The numerical control device according to the invention obviously permits to use all the sets of cams which the latheman has kept in store. For the price of a single lathe specifically constructed in function of the numerical control, several devices according to the invention can be acquired to equip many lathes hitherto mechanically and exclusively controlled by cams, thereby taking advantage of the numerical control while retaining the advantages of the mechanical control for the great series of workpieces to be produced.

Although the above standing description relates to a numerical control device associated with a Swiss type lathe, it will appear obvious to those skilled in the art that the device described can just as well be associated with a profiling automatic lathe which has a fixed headstock and with which it will be even more advantageous, because all the turning operations with such a lathe consist in recessing feeds of especially shaped cutting tools and not by a forward motion of the headstock.

What is claimed is:

1. In a single spindle automatic lathe having tools cyclically performing machining operations on a workpiece and finally severing it from a bar of stock, a camshaft mechanically controlling said tools, a first motor driving said spindle and a second motor driving said camshaft, the arrangement of a numerical control device comprising:
    an encoder being associated with said camshaft and uninterruptedly recording the successive angular positions thereof, and
    a numerically programmable memory programmed in view of the control of the rotational speed of said motors,
        said memory permanently receiving from said encoder informations corresponding to the records thereof and,
        as said informations proceed, immediately and simultaneously transmitting to said first and to said second motor mandatory instructions according to its running program,
        said instructions causing said motors to rotate at speeds ensuring a work of said tools under the best possible conditions.

2. In a single spindle automatic lathe according to claim 1, the arrangement of a numerical control device further comprising a programming station with keyboard being arranged to permit introducing in said memory a program corresponding to the nature and shape of the workpieces to be manufactured.

3. In a single spindle automatic lathe according to claim 1, the arrangement of a numerical control device further comprising a frequency changer connected between said memory and said first motor.

4. In a single spindle automatic lathe according to claim 1, the arrangement of a numerical control device further comprising an amplifier connected between said memory and said second motor.

5. In a single spindle automatic lathe according to claim 1, the arrangement of a numerical control device further comprising:
    a programming station with keyboard to introduce in said memory a program corresponding to the nature and shape of the workpieces to be manufactured;
    a frequency changer connected between said memory and said first motor;
    an amplifier connected between said memory and said second motor;
    a first manually adjustable correcting unit connected between said memory and said frequency changer, and
    a second manually adjustable correcting unit connected between said memory and said amplifier,
        said programming station permitting to activate at will said correcting units between any pair of informations received in said memory,
        the activated correcting units independently permitting to modify in a manually adjustable ratio the mandatory instructions of said memory to said frequency changer and to said amplifier, respectively.

* * * * *